United States Patent Office 3,635,900
Patented Jan. 18, 1972

3,635,900
POLYESTER CONDENSATION PROCESS USING ALKALI METAL GERMANATES
John A. Price, Swarthmore, and Mary J. Stewart, Riddlewood, Pa., assignors to FMC Corporation, Philadelphia, Pa.
No Drawing. Filed Oct. 28, 1969, Ser. No. 871,948
Int. Cl. C08g 17/015
U.S. Cl. 260—75 R                                    8 Claims

ABSTRACT OF THE DISCLOSURE

Process of preparing saturated linear polyester resins comprising carrying out an ester-interchange reaction between a lower alkylene glycol and a lower alkyl diester of a saturated aromatic dicarboxylic acid or carrying out a direct esterification reaction between a lower alkylene glycol and a saturated aromatic dicarboxylic acid and polycondensing the reaction product thereof in the presence of an alkali metal germanate as a polycondensation catalyst.

---

This invention relates to an improved method for the preparation of linear polyesters. More particularly, it relates to an improved polycondensation catalyst for use in the manufacture of highly polymeric linear polyesters.

It is known that linear polyesters can be prepared from a suitable ester of a dicarboxylic acid or a dicarboxylic acid by initially reacting such a material with a diol. When an ester of a dicarboxylic acid is used as a starting material, it is first reacted with a diol in the presence of a transesterification catalyst by means of an ester-interchange reaction; whereas, when a dicarboxylic acid is used as a starting material, it is first subjected to a direct esterification reaction with a diol in the presence of what is generally called a first stage catalytic additive or ether inhibitor. In either instance, the resulting reaction product which may be, in general, described as a polyester prepolymer, is then polycondensed in the presence of a polycondensation catalyst to form a polyester resin.

In the case of the transesterification method of preparing polyethylene terephthalate wherein ethylene glycol is reacted with dimethyl terephthalate, the product of the transesterification reaction is generally described as being comprised mainly of bis-(2-hydroxyethyl) terephthalate. Whereas, the first stage reaction product of the direct esterification reaction between ethylene glycol and terephthalic acid is comprised of bis (2-hydroxyethyl) terephthalate along with substantial quantities of higher condensates of ethylene glycol and terephthalic acid. In particular, the product of the direct esterification reaction between ethylene glycol and terephthalic acid and the product of the transesterification reaction betweeen dimethyl terephthalate and ethylene glycol can be described as bis(2-hydroxyethyl) terephthalate or a polycondensation product thereof, wherein the D.P. (degree of polymerization) varies from about 2 to about 6. However, for purposes of simplicity in describing the present invention, hereinafter the terms "polyester prepolymer" and "bis(2-hydroxyethyl) terephthalate" will both denote and include within their scope the product of the direct esterification reaction between terephthalic acid and ethylene glycol and the product of the transesterification reaction between dimethyl terephthalate and ethylene glycol as set forth above.

From a commercial standpoint, it is essential that a polyester resin be produced in the shortest possible time and the desired degree of polymerization be obtained. A polyethylene terephthalate resin suitable for melt spinning should have a carboxyl content value of about below 50 equivalents per million grams (eq./$10^{-6}$ gr. or meq./kg.), a diethylene glycol content of about or less than 1% by weight, and an intrinsic viscosity preferably not less than about 0.60 (determined in a 60%phenol and 40% tetrachloroethane solution, wt./wt., at 30° C.), in order for the filaments formed therefrom to possess a satisfactory level of hydrolytic stability, thermal stability, ultra-violet light stability and a high degree of tenacity which is necessary for the use of such filaments in the manufacture of fibers such as is used in wash and wear clothing. Additionally, particularly for fiber and film purposes, it is essential that the polyeter resin be substantially colorless or white.

It is an object of the present invention to prepare highly polymeric linear polyesters by a direct esterification reaction between a dicarboxylic acid and a diol or by an ester-interchange reaction between an ester of a dicarboxylic acid and a diol, so as to form a polyester prepolymer and then the polycondensation of the said polyester prepolymer in the presence of an improved polycondensation catalyst.

It is another object of the present invention to prepare a highly polymeric linear polyester resin by polycondensing bis(2-hydroxyethyl) terephthalate in the presence of an improved polycondensation catalyst.

These and other objects are accomplished in accordance with the present invention which involves a method for preparing highly polymeric linear polyesters wherein a lower dialkyl ester of a saturated aromatic dicarboxylic acid is reacted with a diol in the presence of an ester-interchange catalyst to form a polyester prepolymer or where a saturated aromatic dicarboxylic acid is reacted with a diol in the presence of a first stage additive to form a polyester prepolymer and where the resulting polyester prepolymer is polycondensed in the presence of a polycondensation catalyst, the improvement comprising carrying out the polycondensation of the polyester prepolymer in the presence of a catalytic amount of an alkali metal germanate. The germanates of the present invention are derived from tetra-valent germanium.

For example, among the alkali metal germanate compounds that can be used in accordance with the present invention are sodium metagermanate, sodium heptagermanate, lithium metagermanate, potassium heptagermanate, lithium heptagermanate, potassium metagermanate and caesium metagermanate.

The terms "saturated aromatic dicarboxylic acid" and "lower dialkyl ester of a saturated aromatic dicarboxylic acid," are used herein to denote dicarboxylic acids or esters thereof which do not contain any olefinic unsaturation and wherein the alkyl groups contain from 1 to 6 carbon atoms. In accordance with the present invention, any of the well-known saturated aromatic dicarboxylic acids or their esters can be used in the present method. For example, among those which can be used are isophthalic acid, terephthalic acid, and mixtures of these acids with minor amounts of other suitable acids such as p,p'-diphenylcarboxylic acid, 2,6-naphthalene dicarboxylic acid, and p,p'-dicarboxyl-diphenyl sulfone.

The terms "diol" and "lower alkylene glycol" are used herein to denote glycols of the series HO(CH$_2$)$_n$OH, wherein $n$ is 2 to 4. Among the diols which can be used are, for example, ethylene glycol, 1,3-propylene glycol, and 1,4-butylene glycol. In addition, in accordance with the present invention, minor amounts of other diols can be used such as 2,2-dimethyl-1,3-propanediol, 2,2-dimethyl-1,4-butanediol, and cyclohexane dimethanol.

The preparation of polyesters via the ester-interchange reaction is generally carried out with a molar ratio of glycol, such as ethylene glycol, to dialkyl terephthalate, such as dimethyl terephthalate, of from about 1:1 to about 15:1, respectively, but preferably from about 1.5:1 to about 2.6:1. The transesterification reaction is generally carried out at atmospheric pressure in an inert atmosphere such as nitrogen, initially at a temperature range of from about 125° C. to about 250° C., but preferably between about 150° C. and 200° C. in the presence of a transesterification catalyst. During the first stage of this reaction, methyl alcohol is evolved and is continuously removed by distillation. After a reaction period of about one to two hours, the temperature of the reaction mixture is raised from about 200° C. to about 300° C. for appropriately one to three hours in order to complete the reaction, form the desired polyester prepolymer and distill off any excess glycol.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the weight of the dialkyl terephthalate used in the initial reaction mixture.

Similiarly, the preparation of polyester resin via the direction esterification reaction is generally carried out with a molar ratio of glycol, such as ethylene glycol, to dicarboxylic acid, such as terephthalic acid, of from about 1:1 to about 15:1, but preferably about 1.5:1 to about 2.6:1. The direct esterification step is generally carried out at temperatures ranging from about 180° C. to about 280° C. in the absence of an oxygen containing atmosphere at atmospheric or elevated pressure for about two to four hours to form the desired polyester prepolymer. For example, the reaction may be carried out in an atmosphere of nitrogen.

Any known suitable first stage direct esterification catalytic additive or buffer may be used in the direct esterification step of the present method. For example, calcium acetate or triethylamine may be used. The first stage catalytic additives are generally used in concentrations ranging from $5 \times 10^{-5}$ mole to about $5 \times 10^{-2}$ mole of catalytic additive per mole of terephthalic acid present in the initial terephthalic acid-glycol reaction mixture.

The polycondensation step of the present invention is accomplished by adding an alkali metal germanate compound of the present process to a polyester prepolymer or bis(2-hydroxyethyl) terephthalate and heating the blend thereof under reduced pressure within the range of from about 0.05 mm. to 20 mm. of mercury while being agitated at a temperature of from about 260° C. to about 325° C. for from about one to two hours. Also, if indicated, the subject polycondensation catalysts can be added to the reactants before the prepolymer is formed.

The polycondensation catalysts of the present invention are generally employed in amounts ranging from about 0.0075% to about 0.2%, based on the weight of the polyester prepolymer to be polycondensed. Usually, it has been found that from about 0.01% to about 0.1% of the subject polycondensation catalyst is preferred in most instances. Higher or lower concentrations of the present polycondensation catalysts can also be used in the subject polycondensation reaction. However, when concentrations less than the above are used, their effectiveness is generally reduced; whereas if concentrations greater than this are used, no further improvement in the present method or desired product is generally obtained.

The following examples of several preferred embodiments will further serve to illustrate the present invention. All parts are by weight unless otherwise indicated.

EXAMPLE I

A mixture comprising 600 grams of dimethyl terephthalate, 361 grams of ethylene glycol, and 0.48 gram of zinc acetate dihydrate was charged into a reaction vessel equipped with a nitrogen inlet, heating means and stirring means. The reaction mixture was agitated and heated at atmospheric pressure to 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and excess ethylene glycol and form the polyester prepolymer comprised mainly of bis-(2-hydroxyethyl) terephthalate. The prepolymer product was allowed to cool under an atmosphere of nitrogen.

EXAMPLE II

Fifty grams of the prepolymer product of Example I was mixed with 0.0079 gram of sodium metagermanate ($Na_2GeO_3$) and placed in a reaction vessel. This mixture was heated at about 280° C. under reduced pressure of about 0.1 mm. of mercury for 1½ hours while under agitation to bring about the polycondensation of the prepolymer product and formation of a polyester resin. The polyester resin product formed had an intrinsic viscosity of 0.81, a carboxyl content value of 32 (meq./kg.), a Y (C.I.E.) color value of 72.5, and a diethylene glycol content of 1.0% by weight.

EXAMPLE III

Fifty grams of the prepolymer of Example I was mixed with 0.0062 gram of sodium heptagermanate $$Na_3HGe_7 \cdot 4H_2O$$

and placed in a reaction vessel. This mixture was heated at about 280° C. under reduced pressure of about 0.1 mm. of mercury while under agitation for about 1½ hours to bring about the polycondensation of the prepolymer. The polyester resin product formed had an intrinsic viscosity of 0.77, a carboxyl content value of 46 (meq./kg.), a Y (C.I.E.) color value of 68.4, and a diethylene glycol content of 1.18% by weight.

EXAMPLE IV

Fifty grams of the prepolymer product of Example I is mixed with 0.021 gram of lithium metagermanate ($Li_2GeO_3$) and placed in a reaction vessel. This mixture is heated at about 280° C. under reduced pressure of from about 0.05 to about 0.1 mm. of mercury while under agitation for about 1½ hours to bring about the polycondensation of the prepolymer product. The polyester resin formed had an intrinsic viscosity in excess of 0.60, a carboxyl content value less than 50 (meq./kg.), a Y (C.I.E.) color value in excess of 68.0, and a diethylene glycol content of about 1.0%.

The intrinsic viscosity of the polyester resin products of the above examples were measured in a 60% phenol-40% tetrachloroethane solution, wt./wt., at 30° C. The other analytical values expressed were obtained by conventional laboratory procedures.

The color values of the resins in the above examples were obtained by measuring the reflectance of the resin with a "Color-Eye" (Model D-1) which is a tradename for a differential colorimeter manufactured by the Instrument Development Laboratories, Attleboro, Mass. The color values obtained are based on luminance (Y in the C.I.E. System) which is a measure of the proportion of the incidence light reflected relative to a white vitrolite standard and, therefore, a measure of the whiteness of the polyester resin product being evaluated. Based on a theoretically possible Y value of 100, the higher the Y value, the whiter the resin product. Correspondingly, the lower the Y value or number, the darker the resin product. The determination of Y in the C.I.E. System as set forth above in the examples was carried out by using molded plaques of the polyester resin product having the dimensions 1″ x 1″ x ⅟₁₆″. These plaques were prepared on a Carver Press.

The results in the above examples indicate that very small amounts of the subject alkali metal germanate compounds are effective in facilitating the preparation of polyester resin products, which are characterized by high intrinsic viscosities and excellent color. With the use of such small amounts of the present germanates, polyester resin products having excellent properties are obtained through normal or less than normal polycondensation cycle times.

Further, with the use of the subject germanates, polyester resins can be produced through very short polycondensation cycle times by employing concentrations of the present germanates equal to concentrations of other polycondensation catalysts generally used, such as antimony oxalate.

We claim:

1. In a process of preparing a linear polyester resin wherein a lower alkyl diester of a saturated aromatic dicarboxylic acid is reacted with a lower alkylene glycol in the presence of an ester-interchange catalyst to form a polyester prepolymer or where a saturated aromatic dicarboxylic acid is reacted with a lower alkylene glycol in the presence of a first stage catalytic additive to form a polyester prepolymer and where the resulting polyester prepolymer is then polycondensed in the presence of a polycondensation catalyst, the improvement comprising carrying out the polycondensation of the said polyester prepolymer in the presence of a catalytic amount of a polycondensation catalyst selected from the group consisting of those represented by the formulas $M_2GeO_3$ and $M_3HGe_7O_{16}$ wherein M is an alkali metal.

2. The process of claim 1 wherein the polycondensation catalyst is present in a concentration between the range of from about 0.0075% to about 0.2%, based on the weight of the polyester prepolymer.

3. The process of claim 1 wherein the polycondensation catalyst is sodium heptagermanate.

4. The process of claim 1 wherein the polycondensation catalyst is sodium metagermanate.

5. The process of claim 1 wherein the polycondensation catalyst is lithium metagermanate.

6. The process of claim 1 wherein the polycondensation catalyst is potassium heptagermanate.

7. The process of claim 1 wherein the polycondensation catalyst is potassium metagermanate.

8. The process of claim 1 wherein the polycondensation catalyst is lithium heptagermanate.

References Cited

UNITED STATES PATENTS 3,459,711   8/1969   Hartmann et al. _____ 260—75

OTHER REFERENCES

Pascal: Nouveau Traite De Chime Minerale, Tome VIII Troisieme Fasicule, published 1963, Masson Et Cie, Paris, France; Title page and pages 118–123 and 133–135.

WILLIAM H. SHORT, Primary Examiner

L. P. QUAST, Assistant Examiner

UNITED STATES PATENT OFFICE
CERTIFICATE OF CORRECTION

Patent No. 3,635,900   Dated January 18, 1972

Inventor(s) John A. Price and Mary J. Stewart

It is certified that error appears in the above-identified patent and that said Letters Patent are hereby corrected as shown below:

Col. 1, line 71 "$10^{-6}$" should read -- $10^6$ --. Col. 2, line 10, "polyeter" should read -- polyester --. Column 4, line 24, the formula "$(Na_3HGe_7 \cdot 4H_2O)$" should read -- $(Na_3HGe_7O_{16} \cdot 4H_2O)$ --. Col. 6, line 21, "Chime" should read -- Chimie --

Signed and sealed this 4th day of July 1972.

(SEAL)
Attest:

EDWARD M. FLETCHER, JR.          ROBERT GOTTSCHALK
Attesting Officer                Commissioner of Patents